United States Patent [19]

Fredriksson et al.

[11] Patent Number: 5,624,310
[45] Date of Patent: Apr. 29, 1997

[54] SYSTEM AND METHOD FOR AIR CONDITIONING OF VEHICLES PREVENTING WINDOW INSIDE FOGGING

[75] Inventors: Bernt Fredriksson, Vanersborg; Thomas Andersson, Bralanda, both of Sweden

[73] Assignee: Saab Automobile Aktiebolag, Sweden

[21] Appl. No.: 505,320
[22] PCT Filed: Dec. 23, 1993
[86] PCT No.: PCT/SE93/01105
    § 371 Date: Sep. 25, 1995
    § 102(e) Date: Sep. 25, 1995
[87] PCT Pub. No.: WO95/17315
    PCT Pub. Date: Jun. 29, 1995
[51] Int. Cl.$^6$ ................................................ B60S 1/54
[52] U.S. Cl. ........................................ 454/121; 62/182
[58] Field of Search ................... 62/180, 182; 454/75, 454/121

[56] References Cited

U.S. PATENT DOCUMENTS

| | | | |
|---|---|---|---|
| 2,492,970 | 1/1950 | Curry | 62/182 X |
| 4,860,552 | 8/1989 | Beckey | 62/180 X |
| 5,167,365 | 12/1992 | Mitoshi et al. | |
| 5,301,515 | 4/1994 | Iritani et al. | 454/121 X |

FOREIGN PATENT DOCUMENTS

| | | | |
|---|---|---|---|
| 60-85013 | 5/1985 | Japan . | |
| 61-1526 | 1/1986 | Japan . | |
| 62-1622 | 1/1987 | Japan | 454/121 |

Primary Examiner—Harold Joyce
Attorney, Agent, or Firm—Ostrolenk, Faber, Gerb & Soffen, LLP

[57] ABSTRACT

System and method for air conditioning of vehicles to prevent inside window fogging, the vehicle having a compartment with a windscreen heated by an air flow of controlled temperature, and the system including an evaporator, a blower or fan for drawing air over the evaporator and ducting for air distribution. In order to prevent misting of the inside of the windscreen after the vehicle has been parked with the engine shut off, the fan is deactivated and preferably also the fresh air intake is closed for a time period after switching on the air conditioning system.

17 Claims, 2 Drawing Sheets

SYSTEM AND METHOD FOR AIR CONDITIONING OF VEHICLES PREVENTING WINDOW INSIDE FOGGING

BACKGROUND OF THE INVENTION

The present invention is related to air conditioning systems for vehicles and in particular, but not exclusively, for motor cars which have an air heated window, particularly a windscreen.

BACKGROUND

Most vehicles are now equipped with air conditioning and heating systems for maintaining the air within the vehicle passenger compartment at a set desired temperature value.

The air conditioning system supplies an air flow of controllable temperature to the passenger compartment. There are two types of air conditioning systems: a) an Automatic Climate Control (ACC) in which the temperature in the passenger compartment is monitored by a temperature sensor and the system is operated to maintain the passenger compartment at a desired temperature, and b) Automatic Temperature Control (ATC) in which the temperature of the air leaving the air distribution system is regulated to a desired temperature.

A problem that can occur with the air conditioning systems which have a heat exchange system including an evaporator, is that when the vehicle is left dormant after use, and then re-used after a short time period of idleness, usually in the order of one minute to 12 hours, then when the air conditioning system is reactivated large quantities of moisture laden air may be blown onto the windscreen if the system is set to windscreen demise or defrost. If the ambient air temperature is within the range 0–22 degrees C then the moisture in the air coming from the heating, ventilation and air conditioning unit (HVAC-unit) may condense on the glass areas inside the car reducing the sight of the driver.

This effect is caused by the evaporator having become chilled during previous use of the air conditioning system and therefore having a considerable amount of water condensed on the evaporator surface. During a vehicle stand still, or deactivation of the air conditioning system, the evaporator warms up above the ambient air temperature and the large quantities of water on the surfaces saturates the warmer air around the evaporator. If the air conditioning system blower is started in this condition the moisture laden air is carried away from the evaporator and if the system is set to windscreen defrost/defog position, or if air leaks to defrost/defog air ducts, then the moisture laden air is deposited on the glass areas.

SUMMARY OF THE INVENTION

The present invention seeks to prevent the depositing of large amount of condensate on the inside of the glass areas when first activating an air conditioning system after the vehicle has been dormant for a short period of time.

According to the invention there is provided an air conditioning system for a vehicle having a compartment with at least one window which is heatable by an air flow of controlled temperature, the air conditioning system including a distribution system which directs air flow to the window, a heat exchange system which includes an evaporator, a fan or blower for forcing air over the evaporator and a control means connected to the fan, characterised in that the control means includes a means for deactivating the fan for a predetermined time limit after activation of the air conditioning system.

The fan or blower has to be deactivated until the evaporator (or cooling device) has reached the optimum low temperature, which means between 5–20 seconds after activating the air conditioning compressor (in a reversed Carnot-cycle) and normally about 10 seconds.

Preferably the system further includes an external temperature sensor and is characterised in that the deactivating means is activated by the control means in response to signals from the external temperature sensor.

Conveniently the system further includes a solar sensor for sensing the intensity of the suns rays and which is connected to the control means, characterised in that the deactivation means is operably controlled by the control means in response to signals from the solar sensor.

Also according to the invention there is provided a method of controlling the air condition system for a vehicle having a compartment with at least one window which is heated by an air flow of controlled temperature which passes over a heat exchange system including an evaporator, characterised in that after activation of the air conditioning compressor, air flow over the evaporator is prevented until the evaporator has reached a sufficiently low temperature for condensing the moisture contained in the air inside the HVAC unit.

The air conditioning system could be activated so that the compressor starts up when the vehicle ignition is switched on, or preferably the air conditioning is activated only after the vehicle engine start up. The start up may be sensed by the engine speed, so that the system is activated by a predetermined minimum engine speed.

By preventing the operation of the system fan, in order to prevent air flow over the evaporator, the moisture laden air is retained around the evaporator for a sufficiently long time to condense on the cooled surfaces thereby preventing the moisture from being transferred into the air distribution system.

The above invention is particularly applicable only when the external temperature is in the range of 0–22 degrees C and particularly in the 0–17 degrees C.

Further if the vehicle is idle for less than one minute the problem will not arise if the vehicle is parked for more than twelve hours for the following reasons:

a) at short stops the glass temperature will not be low enough to pass the dewpoint of the air coming from the HVAC unit.

b) At long term (>12 hours) parking the temperature in and around the evaporator is equalized with the ambient (glass) temperature.

BRIEF DESCRIPTION OF THE DRAWINGS

The invention will be described by way of example and with reference to the accompanying drawings in which.

DETAILED DESCRIPTION OF THE PREFERRED EMBODIMENT(S)

Figure 1:
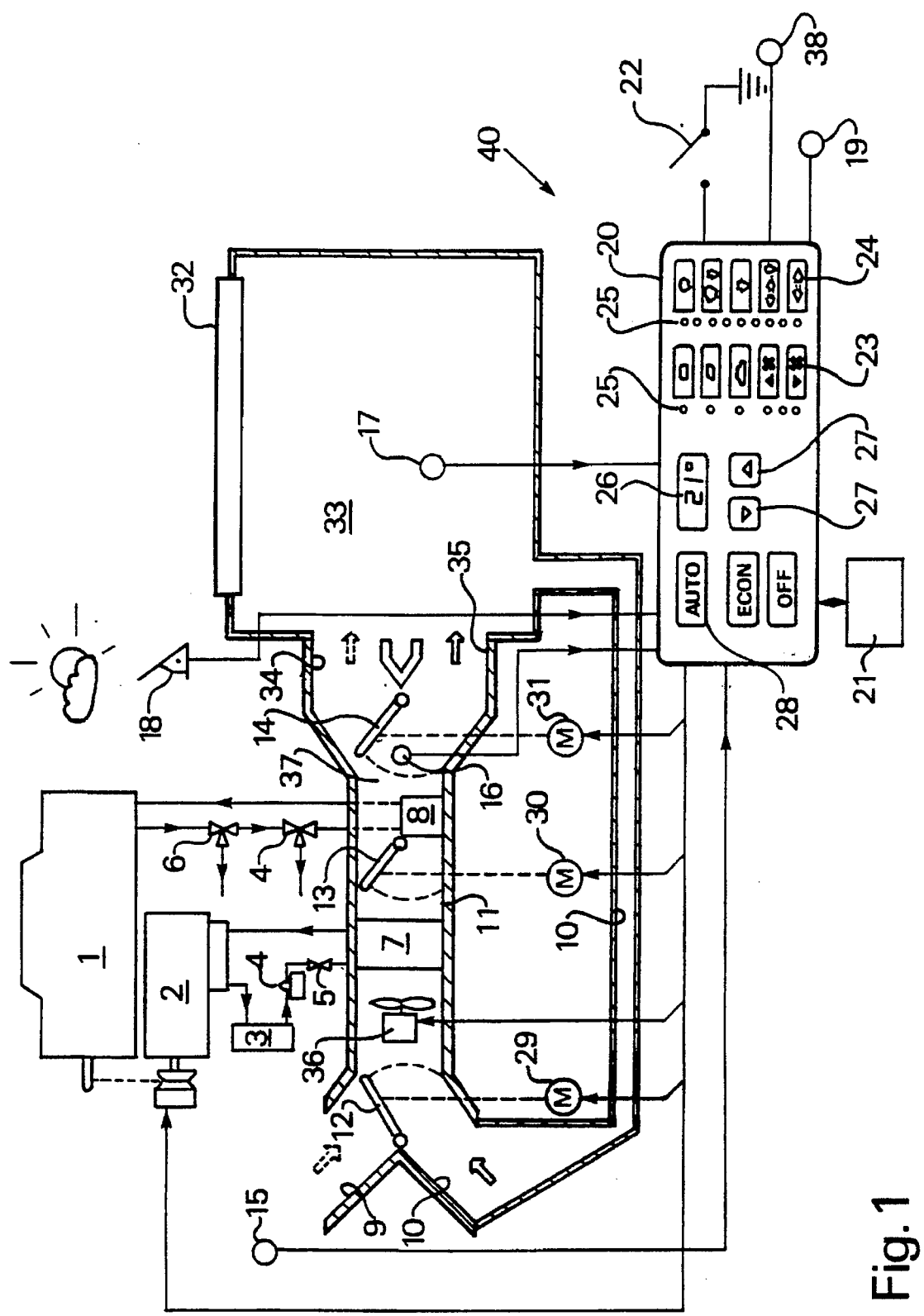
FIG. 1 is a schematic drawing of an air conditioning system for the interior of a passenger compartment of a motor vehicle.

With reference to FIG. 1 of the drawings there is illustrated in schematic form a motor vehicle with an ACC type air conditioning system for a passenger car having a passenger compartment 33 with a window 32, preferably the front windscreen.

A motor car has a water cooled internal combustion engine 1, which is connected via conduit to a heat exchanger 8 so that heat exchanger is heated by coolant from the engine. The flow of coolant to the exchanger 8 is controlled by a thermostatic valve 6 in the engine or in close connection to the engine. Furthermore, there may he a manually or automatically manouvered water valve 41 in close connection to the heating system's heat exchanger.

The engine 1 drives an air conditioning compressor 2 via a belt driven pulley. The compressor 2 is part of a circulatory cooling system in which the compressor exit is connected to a condenser 3, a receiver 4, an expansion valve 5, and an evaporator 7. A return conduit connects the evaporator 7 to the inlet of the compressor. This is named the normal reversed Carnot-cycle.

The interior of the passenger compartment is conditioned/ventilated by an air conditioning system which comprises ducting 11 having an ambient air inlet duct 9 to receive ambient or fresh air form outside of the vehicle, and a recirculation duct 10 to receive recirculated air form within the passenger compartment 33. The air can be drawn into the ducting 11 by a blower or fan 36, driven by an electric motor.

The inducted air is then conditioned by a heat exchange system in which the air is first cooled by the evaporator 7 and can then passed over the heat exchanger 8. The proportion of the air flow passing over the heat exchanger 8 is controlled by a first distributor in the form of a gate valve referred to as a heater flap 13 operated by a motor 30 or other actuator.

The heated air (if any) and non-heated air is remixed in a mixing chamber 37 upstream of a second flow distributor in the form of a gate valve 14 referred to as a distribution flap 14 and is then discharged into the passenger compartment 33 via outlet ducts 34, 35. The outlet ducts comprise upper ducts 34 such as facial vents, or windscreen vents, and floor vents 35.

The temperature of the mixed air in the mixing chaser 37 is sensed by a mixed air temperature sensor 16. The distribution flap 14 is controlled by a motor 31, or other actuator, to determined the air flow distribution between the upper ducts 34 to the windscreen etc. and the floor vents 35. The temperature oft the air entering the air ducts can also be controlled by means of a water valve 41 in close connection to the heat exchanger.

The ratio of recirculated air to fresh air entering the ducting 11 is controlled by a third distributor means in the form of gate valve 12 referred to as a recirculation flap operated by a motor 29 or other actuator. The temperature of the ambient or fresh air entering the ducting 11 is monitored by an ambient air temperature sensor 15.

The temperature within the passenger compartment 33 is monitored by a passenger compartment temperature sensor 17, and a solar sensor 18 may be located within the passenger compartment to measure the suns intensity, elevation, and azimuth.

The air conditioning system is controlled by a control means 40 including electronic circuitry and microprocessor. The control means has a control unit and display 20 connected to a memory 21. The unit 20 is connected to each temperature sensor 15, 16, and 17 for monitoring respectively the ambient air temperature, mixed air temperature, and passenger compartment temperature.

The unit 20 is also connected to the motors 29, 30, 31 of the three flaps 12, 13, 14 for control of the air flow.

The blower fan 36 and compressor 2 are also connected to the control unit 20, as are the solar sensor 18, engine starter sensor 38 for sensing engine cranking and an engine speed sensor 19, for sensing when the speed of the engine is above a predetemined value say in the range 120–500 rpm.

The unit 20 is activated by the vehicle ignition switch 22 and the display includes indicator lamps 25, a temperature display 26 with associated temperature up/down adjusters 27, function selectors 23, distribution selectors 24, and automatic mode selector 28 (ACC type operation as opposed to manual operation). Typical function selectors 23 are rear window defrost, rear side window defrost, recirculation control, fan speed. Typical distribution selectors 24 are windscreen defrost, defrost and floor vents, floor vents, floor vents and facial vents, and facial vents only.

Figure 2:
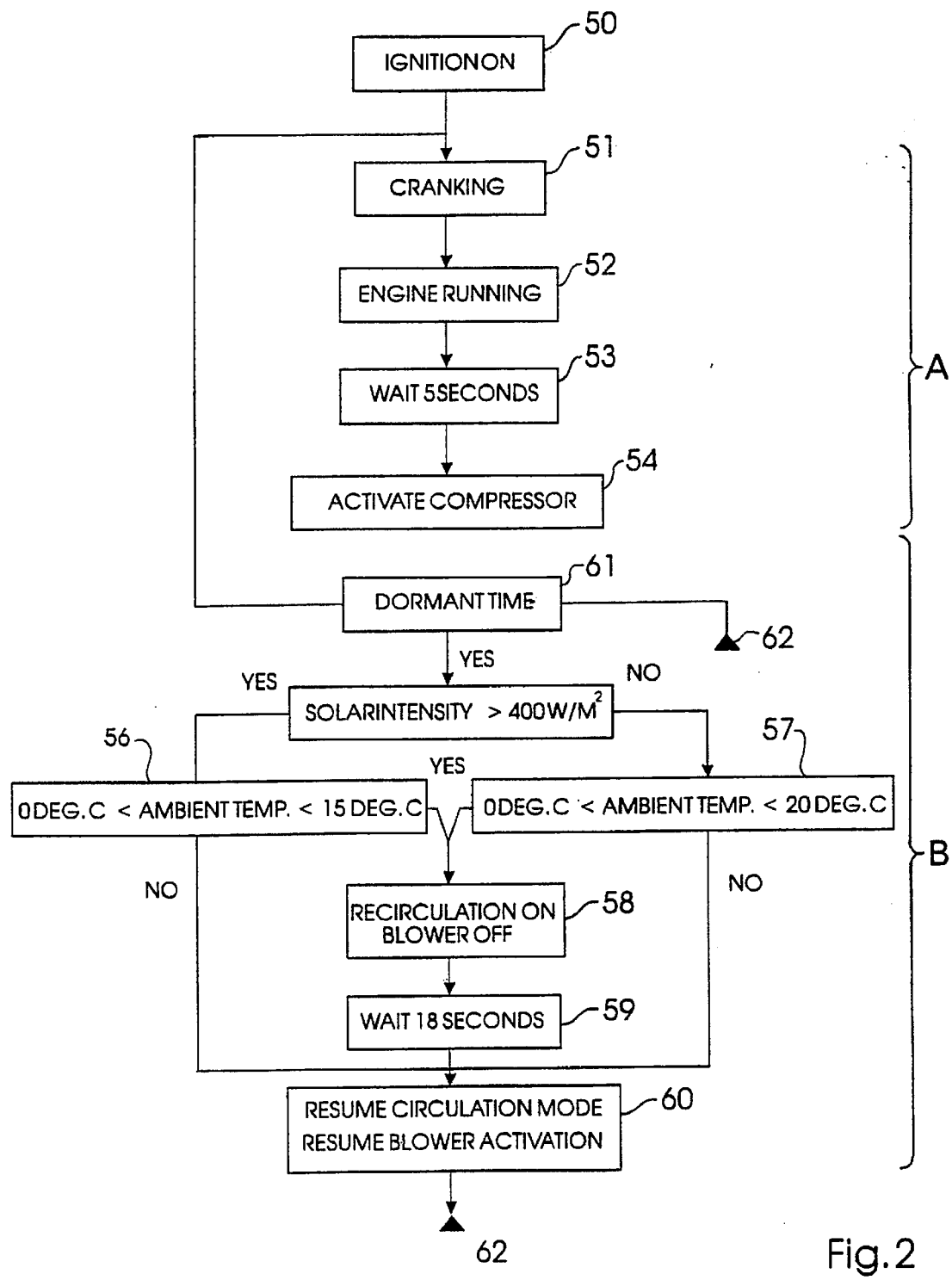
FIG. 2 is a flow chart of a control sequence for the control means of the above system.

With reference to the flow chart in FIG. 2, when the vehicle ignition 22 is switched on the control means 40 will go through two sets of subroutines A & B as shown, wherein subroutine A activates the compressor and subroutine B activates the fan. In the query step 50, the ignition is monitored for switching on, and when the ignition is switched on the steps in series A and series B will be initiated.

The first step 51 in subroutine A starts by monitoring the activation of the starter motor by sensor 38, and in query step 52 the engine speed is monitored to check if the vehicle engine has started. Vehicle starting could be assessed by monitoring the rotational speed of the flywheel and arbitrarily assessing vehicle start up as an engine speed above 120 rpm or whatever engine speed is desired. Control step 52 then imposes a waiting period say 5–10 seconds in step 53 for the engine to have reached established running conditions and in step 54 the control 40 activates the vehicle compressor 2 to cause the evaporator 7 to begin to cool. This starting sequence according to subroutine A prevents the compressor from being activated during cranking which could otherwise jeopardize a successful start.

Simultaneously the subroutine B may also be activated depending how long the vehicle or engine has been parked with engine shut off. The first query step 61 determines if the vehicle has been idle for between one minute and twelve hours. If the answer is yes then the subroutine B is activated if the answer is no the blower is not deactivated or activation not delayed and return 62 to main program follows.

The next query step 55 determining whether the solar intensity is above a predetermined limit, for example 400 watts/meter$^2$. If the query step 55 is positive the query step 56 establishes if the external temperature is between say 0° C.–15° C. (or other limits may be suitable say 0° C.–17° C). If query step 55 is negative then the other query step 57 establishes if the external temperature is between 0° C.–20° C. (or other limits such as 0° C.–22° C. may be suitable). Thus it can be seen that high solar intensity reduces the upper limit of the working temperature range of the invention. High solar intensity will warm up the windows and reduce the risk for window inside fogging.

If the response to query steps 56 or 57 is positive then control step 58 deactivates the fan or blower 36, and causes the motor 29 to move the recirculation flap 12 to recirculate only. This is to prevent the so-called ram effect if the vehicle begins to move quickly. That is air being pushed through the fresh air intake 9 on forward movement of the vehicle.

Control step 59 then provides a waiting time which could be in the order of 5–25 seconds allowing the compressor to lower the pressure and thereby the temperature on suction side of the refrigerant circuit (including the evaporator 7). This sequence will normally need 10–18 seconds. The waiting time in step 59 should exceed the waiting period in step 53 for a sufficiently long time for the evaporator to reach a sufficient low temperature for condensing substantially all the moisture contained in the air distribution system.

The next control step 60 enables start-up of the blower or fan 36 at any speed selected automatically by the ACC-system or manually by the driver. Step 60 will also enable the recirculation flap 12 to go to any circulation mode automatically selectable by the ACC-system or manually by the driver.

If query steps 56 and 57 are negative the control step 60 immediately follows without any delayed activation of the blower. Then the blower 36 activation is not delayed, and the recirculation flap 12 is not forced to occupy the recirculation mode during a deactivation period for the blower. The blower could during other ambient conditions than the conditions established by steps 56 and 57, be activated immediately, which other ambient conditions do not cause any risk for window inside fogging. When the start-up sequence, subroutine A and B, is finished return 62 to main program follows.

When the ignition is turned off, or as soon as the engine stops, the timer for the dormant period measurement is activated.

The invention may be applied to any vehicle having an air conditioning system including an evaporator.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

We claim:

1. An air conditioning system for a vehicle having a compartment with at least one window which is heatable by an air flow of controlled temperature, the air conditioning system comprising:

a heat exchange system which includes an evaporator;

an air conditioning compressor connected to the evaporator;

a first distribution system for directing air flow to the evaporator;

a second distribution system for directing air flow from the evaporator to the window;

a fan in the first distribution system for forcing air over the evaporator; and control means connected to the air conditioning compressor and to the fan, the control means including means for activating the air conditioning compressor and for deactivating the fan for a predetermined deactivation period after activation of the air conditioning compressor.

2. An air conditioning system as claimed in claim 1, further including an external temperature sensor for providing an external temperature signal to the control means, the deactivating means being activated by the control means in response to the external temperature signal from the external temperature sensor.

3. An air conditioning system as claimed in claim 2, wherein the deactivating means is activated when the external temperature is in a deactivation range between 0°–22° C.

4. An air conditioning system as claimed in claim 1, in which the first distribution system includes a recirculation duct for recirculating air from the compartment, a fresh air inlet duct for receiving fresh air, and a distribution valve connected to the recirculation duct and the fresh air duct for distributing recirculated air and fresh air to the evaporator, the distribution valve being operably connected to the control means to control the ratio of fresh air to recirculated air passing over the evaporator, the control means causing the distribution valve to close the fresh air inlet duct during the deactivation period.

5. An air conditioning system as claimed in claim 1, further including a solar sensor for sensing the intensity of the suns rays and for providing signals to the control means, the deactivation means being operably controlled by the control means in response to the signals from the solar sensor.

6. An air conditioning system as claimed in claim 5, wherein the control means is responsive to signals from both the solar sensor and the external temperature sensor in order to alter the maximum temperature of the deactivation range.

7. An air conditioning system as claimed in claim 6, wherein the maximum temperature of the deactivation range is reduced as the intensity of the sun's rays increases.

8. An air conditioning system as claimed in claim 1, wherein the control means includes timer means for measurement of time periods for which the vehicle is dormant and the deactivating means is activated by the control means only when the vehicle is dormant for time periods in excess of one minute and less than 15 hours.

9. An air conditioning system as claimed in claim 8, wherein the system further includes an engine start up sensor connected to the control means, the control means activating the air conditioning compressor on sensing vehicle engine start up.

10. A method of controlling an air conditioning system for a vehicle having an engine, an air conditioning compressor and a compartment with at least one window which is heated by an air flow of controlled temperature passing over a heat exchange system including an evaporator, which method comprises: activating the air conditioning compressor, and then preventing air flow over the evaporator for a period until the evaporator has reached a sufficiently low temperature to condense any moisture contained in the air flow.

11. A method as claimed in claim 10, which includes starting the engine before activating the air conditioning compressor.

12. A method as claimed in claim 10, wherein the air conditioning system includes a fan for forcing air over the evaporator and wherein the preventing step includes deactivating the fan for a time period after activation of the air conditioning compressor.

13. A method as claimed in claim 10, wherein the air flow over the evaporator is prevented only when the external temperature falls within a predetermined temperature range.

14. A method as claimed in claim 13, wherein the range is between 0°–22° C.

15. A method as claimed in claim 10, wherein air flow over the evaporator is prevented only after the vehicle has been dormant for a predetermined dormant.

16. A method as claimed in claim 15, wherein the predetermined dormant period is greater than one minute and less than 15 hours.

17. A method as claimed in claim 10, in which the vehicle air conditioning system can recirculate air within the vehicle and/or take in fresh air and during the period that air flow over the evaporator is prevented, the air conditioning system only recirculates air.

* * * * *